United States Patent
Mastromatteo

[11] Patent Number: 6,116,281
[45] Date of Patent: Sep. 12, 2000

[54] CONTROL DEVICES

[76] Inventor: Michael Mastromatteo, 36 Pine La., Pine Bush, N.Y. 12566

[21] Appl. No.: 09/023,373

[22] Filed: Feb. 13, 1998

Related U.S. Application Data

[63] Continuation of application No. 08/470,356, Jun. 6, 1995, abandoned, which is a continuation-in-part of application No. 07/954,689, Sep. 30, 1992, abandoned, which is a continuation-in-part of application No. 07/435,786, Nov. 13, 1989, Pat. No. Des. 326,639, which is a division of application No. 07/004,906, Jan. 20, 1987, Pat. No. 4,924,905, which is a continuation-in-part of application No. 06/578,956, Feb. 10, 1984, abandoned, which is a continuation-in-part of application No. 05/937,968, Aug. 30, 1978, abandoned, which is a continuation-in-part of application No. 05/676,335, Apr. 12, 1976, Pat. No. 4,111,056, which is a continuation-in-part of application No. 08/469,162, Jun. 6, 1995.

[51] Int. Cl.[7] ............................. F16K 7/00; F16K 11/14
[52] U.S. Cl. .............................................. 137/863
[58] Field of Search .................. 222/189.08, 189.09, 222/209, 212, 494; 137/1, 488, 489, 489.5, 400, 410, 78.3, 624.15, 624.2, 863, 881, 907

[56] References Cited

U.S. PATENT DOCUMENTS

| | | | |
|---|---|---|---|
| 4,090,532 | 5/1978 | Story | 137/624.15 |
| 4,524,948 | 6/1985 | Hall | 137/881 |
| 5,025,957 | 6/1991 | Ranalletta et al. | 222/189.09 |
| 5,431,310 | 7/1995 | Kanner et al. | 222/212 |

*Primary Examiner*—William Oen
*Attorney, Agent, or Firm*—Richard A. Joel, ESQ

[57] ABSTRACT

Disclosed is a control device for use in fluid systems. In one embodiment the fluid is a liquid. A substantially cylindrical housing has therein a symmetrical cavity. The cavity is divided in upper and lower chambers by a circular and planar diaphragm. The upper chamber housing wall has protruding therefrom a cylindrical boss having a port for admitting a liquid. The boss forms a valve seat. The diaphragm has a plurality of concentric corrugations surrounding a central planar integral valve member. A media port in the lower chamber housing admits media for putting pressure on the diaphragm. When the pressure exceeds a predetermined value, the valve member closes upon the seat and entraps liquid between the diaphragm and upper chamber housing. The liquid acts to cushion, conforming to the shape of the diaphragm, thereby preventing damage to the diaphragm.

52 Claims, 6 Drawing Sheets

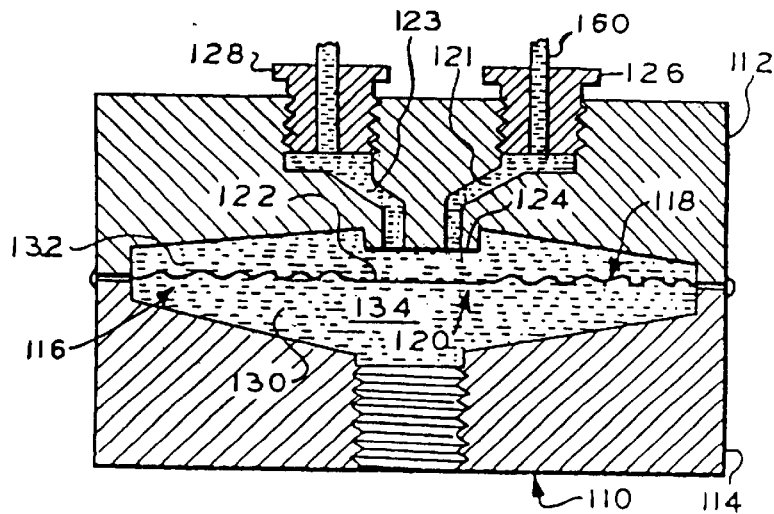
FIG. 9
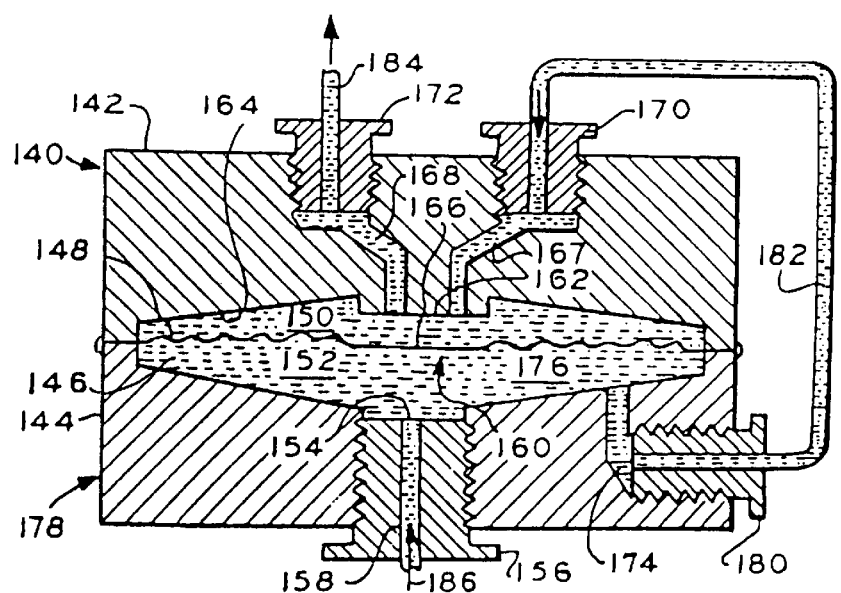
FIG. 10
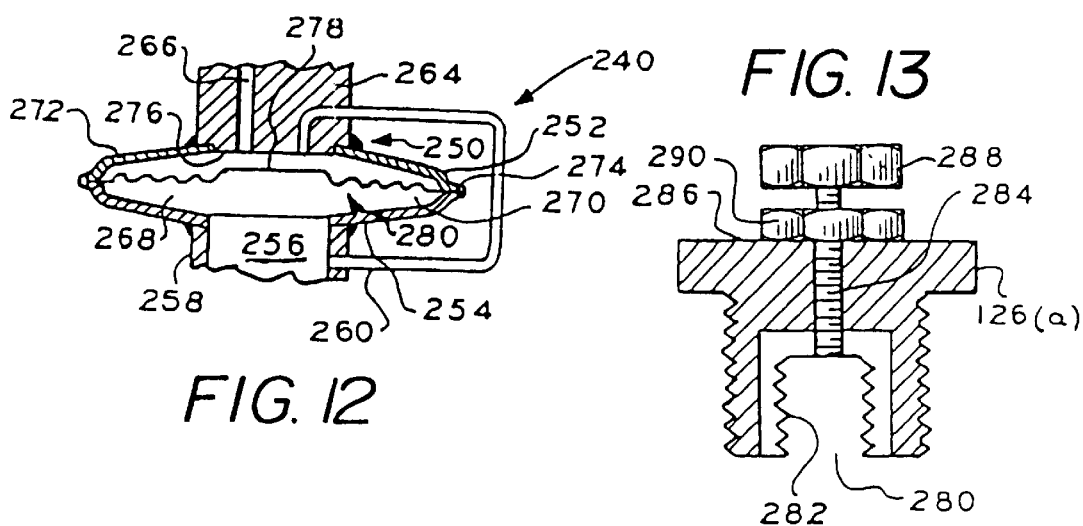
FIG. 12
FIG. 13

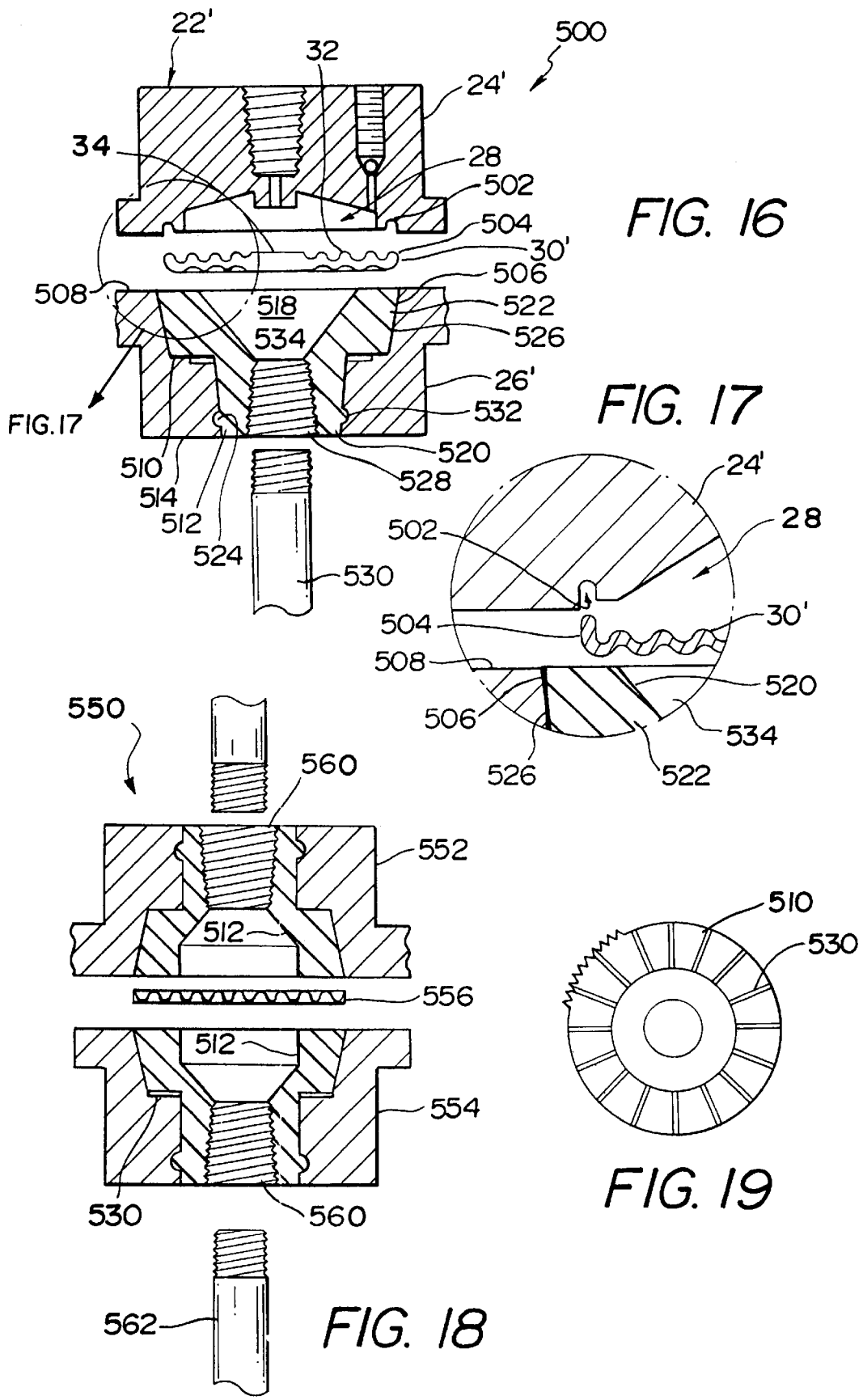

CONTROL DEVICES

CROSS-REFERENCE TO RELATED APPLICATIONS

This application is a continuation of Ser. No. 08/470,356 filed Jun. 6, 1995 abandoned which was a continuation-in-part of Ser. No. 07/954,689 filed Sep. 30, 1992, now abandoned, which was a continuation-in-part of Ser. No. 07/435,786 filed Nov. 13, 1989, now U.S. Pat. No. D. 326,639, which was a divisional of Ser. No. 07/004,906, filed Jan. 20, 1987 now U.S. Pat. No. 4,924,905 issued, May 15, 1990, which was a continuation-in-part of Ser. No. 06/578,956 filed Feb. 10, 1984, now abandoned, which was a continuation-in-part of Ser. No. 05/937,968 filed Aug. 30, 1978, now abandoned, which was a continuation-in-part of Ser. No. 05/670,335, filed Apr. 12, 1976, now U.S. Pat. No. 4,111,056, which was a continuation-in-part of Ser. No. 08/469,162, filed Jun. 6, 1995.

STATEMENT REGARDING FEDERALLY SPONSORED RESEARCH OR DEVELOPMENT

Research and development of the present invention and application have not been Federally sponsored, and no rights are given under any Federal program.

BACKGROUND OF THE INVENTION

1. Field of the Invention

This invention relates to control devices which communicate pressure in fluid devices.

2. Description of the Related Art Including Information Disclosed Under 37 CFR §§1.97–1.98

This invention relates to devices intended to communicate pressure in fluid pressure operated device. Thus, this invention applies to devices intended to transmit liquid or gas pressure, control the flow of liquids in hydraulic systems, prevent the extensive loss of liquids or gases in ruptured hydraulic or gaseous systems, and transmit pressure of liquids, solids, or gases to such liquid or gas operated instruments as pressure gauges, indicators, recorders, pressure transmitters, flow valves, or the like.

3. Description of the Related Art

Controlling the flow or pressure of liquid in hydraulic systems can be troublesome. This may be particularly observed in systems in which a diaphragm is used to transmit the pressure exerted by some media (which may be a gas, liquid, or solid) to a liquid controlled instrument (such as a pressure gauge). In these systems, a diaphragm is secured within a housing cavity. The diaphragm divides the cavity into two separate chambers. The media (or so-called process media) communicates with the diaphragm through a port in the housing into one chamber. The other chamber is filled with a liquid and secured to and communicates through a port to the pressure measuring instrument. The pressure exerted by the process media may be transmitted to this so-called "solid filled" liquid system. Thus, systems of this type are generally referred to as solid (i.e., liquid) filled diaphragm seals. The most difficult problem faced in such systems is the maintenance of the integrity of the diaphragm. If the pressure is somehow lost on the instrument side, the process media may then exert too great a pressure upon the diaphragm, and the differential pressure will exceed the diaphragm spring rate, and the diaphragm will become distorted and the measuring accuracy of the diaphragm seal is lost. In addition, a diaphragm is distorted may, as a result, become ruptured, resulting in the loss of liquid fill and possible contamination of either the measuring instruments or the process media.

A number of devices have been suggested to overcome these problems. Thus, Bissell et al., in U.S. Pat. No. 3,202,063, suggests a diaphragm capsule or unit which comprises a backing member or plate having a rigid axial hub portion permanently united or welded to a diaphragm. The backing member and the diaphragm have corresponding corrugations or convolutions so as to provide a matching seat for the diaphragm to prevent distortion in the event of the loss of fill. This arrangement requires the special manufacture of a removable unit insertable within the housing cavity. The axial stem is provided with an O-ring, the seating of which must be done with precision. Furthermore, it is necessary to match the convolutions or corrugations of the back plate with the diaphragm corrugations.

Still another device has been suggested by Green, in U.S. Pat. No. 2,841,984, in which the corrugations or convolutions of the diaphragm are matched by corrugations in the housing wall itself. Here again, there is a problem of assembly including the matching of the convolutions.

Still another device which used a matching convolution in the diaphragm with those of the housing was taught by Bailous et al., in U.S. Pat. No. 2,833,995.

Still another approach was suggested by Hailer et al. in U.S. Pat. No. 2,667,184, in which two conduit members, for transmitting hydrostatic pressure, include flexible diaphragms covering each end and joined together to form the housing cavity with the two chambers. In this arrangement, the diaphragms abut, one another, thereby sealing the line, but transmitting the hydrostatic pressure. However, because of the necessity of two abutting diaphragms, the diaphragms that are made of metal must be extremely thin and flexible or made of a rubber-lie material. The interconnecting conduits are specified by Hailer et al. to be capillary in form and not adaptable to general hydraulic systems requiring large displacement of liquid and, in particular, those intended to measure the pressure of process media. Hailer et al. also suggests the use of a bleed port at the periphery of the cavity. However, common to other devices herein, if located immediately adjacent to the periphery, the diaphragm would become damaged.

Yet another approach is disclosed in Martin, U.S. Pat. No. 2,317,073. In Martin a bladder or cup 35 is within a housing 18. Liquid is disposed between the cup 35 and the interior wall 20 of the housing 18. As pressure upon the cup 35 increases from the process side of the housing, the cup distends and drives out all of the liquid through a bore or aperture 20. There is no teaching of the entrapment of any liquid in the housing to cushion or protect the cup 35.

Thus, the existing solutions to differential pressure placed upon a flexible diaphragm have been to either double-seal the chamber with matching facing diaphragms, thereby limiting the sensitivity and not inhibiting the possibility of rupture, or to match the convolutions of a more rigid diaphragm with the convolutions in the housing or those of a removable capsule to which thee diaphragm is sealed. These latter arrangements introduce the problem of accurate alignment and assembly. The solution to the problems of diaphragm distortion due to loss of fill has led to an inventive device which is, in turn, applicable to devices having a wider area of usage as more generally referred to hereinabove.

SUMMARY OF THE INVENTION

It is an object of this invention to provide a diaphragm operated controlled device which prevents unnecessary distortion and rupturing of the diaphragm from excessive pressures.

It is another object of this invention to provide a diaphragm controlled device which is simple in construction and assembly and economical in manufacture.

It is still another object of this invention to provide a diaphragm controlled device, the principles of which are applicable to a wide range of hydraulic devices.

It is still a further object of this invention to provide a diaphragm control device which may be adapted to control pressure and flow of liquid therein, thereby providing a valve control system which also protects such systems from excessive loss of liquid upon rupture of such systems.

In accordance with the teachings of this invention, there is provided a control device of the type employing liquids therein which comprises a housing. The housing has a cavity. Diaphragm means are secured within and divide the housing cavity into at least one chamber or compartment. At least this one chamber is adapted to receive the liquid. There is also provided liquid entrapping means within at least one of the chambers and so disposed that, upon a resultant force being applied in a predetermined direction and in excess of a predetermined magnitude against the diaphragm means, the entrapping means, as a result of the force, thereby entraps at least a part of the liquid within the one chamber so that the entrapped liquid prevents the diaphragm from being damaged by the force.

In still another embodiment of this invention, there is provided a control mechanism of the type having a fluid therein. The housing means, as before, has a cavity therein. The diaphragm means is secured within and divides the cavity into at least two chambers. At least one of the chambers is adapted to receive the fluid. he diaphragm means comprises an integral valve member while the housing has a valve seat in the one chamber intended to receive the fluid. A conduit port extends through that valve seat so as to admit the fluid into the chamber. he valve seat in combination with the valve member comprises the valve. he diaphragm is so disposed in dimension such that, upon a force moving the valve member into cooperation with the valve seat, the diaphragm is controllably deformed so as to permanently close the valve.

BRIEF DESCRIPTION OF THE DRAWING

FIG. 9 is a diagrammatic sectional view of a hydraulic flow control device constructed in accordance with the teachings of this invention;

FIG. 12 is a schematic sectional view of another flow control device constructed in accordance with the teachings of this device;

FIG. 13 is a schematic sectional view of a bellows device for controlling the position of a diaphragm;

FIG. 16 is a schematic sectional view of yet another device constructed in accordance with the teachings of the invention;

FIG. 17 is an enlarged portion of the sectional view of FIG. 16;

FIG. 18 is a schematic sectional view of still another device constructed in accordance with the teachings of the invention; and FIG. 19 is a top schematic view of a part of the housing of the device of FIGS. 18 or 16.

DESCRIPTION OF THE PREFERRED EMBODIMENTS

Figure 1:
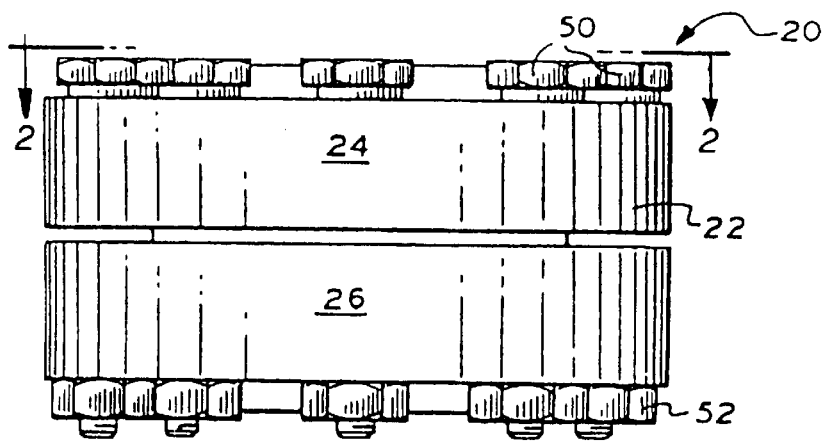
FIG. 1 is a side view of a diaphragm seal constructed in a course of the invention.
Figure 2:
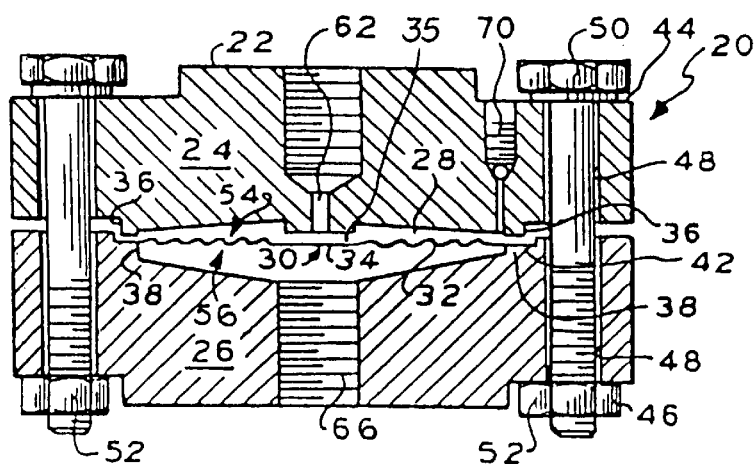
FIG. 2 is a sectional view of the diaphragm seal taken along lines 2—2 of FIG. 1.

Turning now to the drawing, there is disclosed a diaphragm seal 20 of the type that commonly received at one end process media a measuring instrument at the other end. e diaphragm seal 20 may generally comprise a housing 22. The housing 22 may, in turn, be comprised of an upper housing 24, which is usually a unit of rugged steel, or the like, and a lower housing 26, which may be made of much more expensive material as nickel, stainless steel, Monel, Hastelloy, or the like. The housing 22 may be a generally cylindrical shape with the upper and lower housings 24 and 26 comprising substantially equal axial portions of the cylinder. The upper and lower housing 24 and 26 in cross section may have any convenient shape, such as circular, and may have formed therein radially extending depressions which, when joined, form a cavity 28 (FIG. 2). It will be noted that the cavity 28 may have a generally symmetrical shape extending radially from the axial thickness of the housing 22. Preferably, this shape is circular in cross section. A diaphragm 30 (FIGS. 2, 3, and 4) may be disposed within the cavity 28. The diaphragm 30 may be made of any well known flexible material such as Teflon, rubber, or a thin planar sheet metal having therein a plurality of concentric corrugations 32 extending uniformly both above and below the plane of the diaphragm 30. These corrugations 32 make the central portion of the diaphragm 30 flexible and sensitive to variations of pressure exerted upon it. At the center is a circular, uncorrugated area 34, the purpose of which will be fully discussed below. The upper housing 24 may be provided with an annular shoulder 36, which defines the marginal edge of the upper housing portion of the cavity 28. The lower housing 26 may be provided with a corresponding step 38 (Feb. 3), which presents a lateral portion to match the shoulder 36 and an annular shoulder or circumferentially extending edge defining the marginal, radial end of cavity 28 in the lower housing 26.

The diaphragm 30 has a generally planar uncorrugated circumferential surface 40 (FIG. 3), which is gripped by the shoulder 36 of the upper housing and the step 38 of the lower housing 26. The interlocking relationship of the upper housing 24 and lower housing 26 together with the diaphragm 30 serve to seal the seal 20 against leakage at the juncture of the upper and lower housings 24 and 26, respectively. As a further measure, an annular gasket 42 (FIG. 3) may be disposed between the diaphragm 30 and the lower housing 26 and upon the step 38 to further seal the housing 22. However, while such a seal is well known, it may be replaced by a sealant made integral with the diaphragm 30, such as, for example, a Teflon ring (not shown). In a preferred embodiment, the diaphragm 30 may be welded to the periphery of the upper housing 24 so that the lower housing 26 may be disassembled from the upper housing 24 without the upper housing losing any fill. Removal, as is generally known in the art, is for the purpose of clearing the process media side of the seal 20.

The upper and lower housings 24 and 26 may be provided with flange or stepped portions 44 and 46, respectively, in the exterior circumference. These portions 44 and 46 may be drilled with holes 48 which extend parallel to the axis of the cylinder-like housing 22. Flange bolts 50 may be disposed through the holes 48. The entire unit 20 may be clamped together by tightening nuts 52 against the bolts 50 that extend from the upper housing 24 through the lower housing 26.

Figure 3:
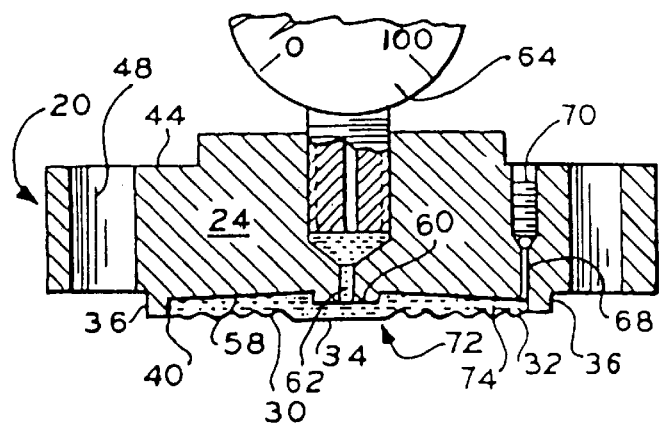
FIGS. 3 and 4 are partially sectional schematic views of the operation of the diaphragm seal of FIG. 1.

In assembly, it will be observed that the diaphragm 30 is secured within the cavity 28 dividing it so that there is a first chamber 54 and second chamber 56 (FIG. 2). The first chamber 54 is defined by an upper surface 58 of the upper housing 24 and the diaphragm 30 (FIG. 3). It will be noted that the upper surface 58 does not extend parallel to the diaphragm 30, but at an acute angle with the radius therein, so that the chamber 54 narrows to the periphery. This is a construction well known in the art. Extending from the axial center of the housing wall 58 may be a valve seat 60. The valve seat 60 may take any other well known configuration of a valve seat. Preferably, as here, the seat 60 is a central, cylindrical boss extending within the first chamber 54 and substantially in registry with the uncorrugated portion 34 of the diaphragm 30. To complete the valve seat 60 there may extend therethrough at least one valve port 62. The valve port 62 may be enlarged at the exterior of the upper housing internally threaded to receive a fitting which may interconnect with, for example, a pressure sensitive instrument 64 (FIG. 5) such as a bourdon tube or the like.

Axially disposed in the lower housing 26 may be a second chamber port 66 (FIG. 2). It will be observed that the diameter of the second chamber port 66 may be substantially larger than the valve port 62 in the upper housing 26. The purpose for this will be more fully disclosed below.

At the radially extending periphery of the cavity 28 and extending through the upper housing 24, parallel to the axis thereof, may be a bleed port 68. The bleed port 68 may be enlarged at the upper position as it exits from the upper housing 24 to admit a ball check valve 70. The function of the bleed port 68 will be more fully discussed below.

As previously indicated, the valve seat 60 of the valve 72 is in registry with a center portion 34 of the diaphragm 30. e combination of this center portion or valve member 34 and the valve seat 60 may be referred to as a valve 72 (FIGS. 3 and 4). he uncorrugated portion 34 of the diaphragm 30 has, as previously discussed, a generally planar surface which may be rigidized by a thickening of the diaphragm 30 itself or by the addition of a sealing material such as teflon, rubber, or the like, thereby forming the valve member 34 valve member 34, when coming in contact with the valve seat 60, serves to close the valve 72.

The valve member 34 and matching valve seat 60 may take any other well known configuration. Thus, for example, the vale seat 60 may be furnished with an annular rim (not shown), which digs into the valve member 34 to assure a firm closing. Alternatively, the valve member 34 may be furnished with a protruding dimple or conical point which enters the port 62 to again assure a tight closing.

Once assembled with the diaphragm 30 disposed between the upper and lower housings 24 and 26 and the housings 24 and 26 secured in place by the flange bolts 50 and nuts 52 and the measuring instrument 64, such as the bourdon tube, secured to the valve port 62, the entire first chamber 54 is filled with a liquid 74 (FIG. 3), which may be, for example, oil or the like. Filling may be accomplished by entering the liquid 74 through the valve port 62 (prior to the addition of the instrument 64) or through the bleed port 68. In either case, the bleed port 68 may be used to remove air from the first chamber 54. The smooth recessed lower surface 58 of the upper housing 24 assures the easy flow of entrapped air bubbles to the outer periphery of the first chamber 54 and the bleed port 68. Thus, the device of this invention, as more fully discussed below, makes possible a bleed port 68 at the periphery of the cavity 28 so that air migrating to that part may be easily removed. In the prior art, bleed ports could not be, it is believed, located at the periphery of a cavity, making such evacuation difficult, if not impossible. It is believed that air could easily become entrapped between the valve port and the periphery of the cavity caused by the bleed port location and/or the matching housing convolutions.

In operation, pressure upon the diaphragm 30 results in pressure upon the liquid 74 in the first chamber 54. This pressure is transmitted to the instrument 64 through the valve port 60. If there is a loss of fill, which may be caused, for example, by a rupture in the connection between the instrument 64 and the housing 22, or the removal of the instrument 64, or distortion of the instrument 64 or connection thereto, the diaphragm 30 will be forced upwardly and the valve 72 will close. As a result of this closing of the valve 72, liquid 74 will be entrapped between the diaphragm 30 and the upper housing wall 58. It will be immediately observed that the liquid 74 so entrapped immediately conforms to both the space and the corrugations 32 of the diaphragm 30. Because the liquid 74 is substantially noncompressible, there is formed a totally confirming buffer, barrier, or stop to the diaphragm 30 with the forces equally distributed throughout. Effectively, the diaphragm 30, by means of the liquid 74, becomes an integral part of the upper housing wall 58 and, therefore, will remain intact. If the valve seat 60 and diaphragm 30 are disposed so that the valve member 34 is seated within the elastic limit of the diaphragm 30, the diaphragm will remain undistorted and resilient, ready for renewed use once the lost liquid or integrity of the connection to the instrument 64 is restored. The pressure rating with which the valve 72 closes is dependent upon the pressure applied, the spring rate of the diaphragm 30, and the distance of the diaphragm valve member 34 from the seat 60.

In the prior art devices, no proper barrier existed between a diaphragm and housing wall. Thus, as previously indicated, it was not possible to place a bleed port at the periphery. In the prior art devices, pressure from the media in the second chamber might cause the diaphragm to enter the bleed port and become damaged. Thus, in filling the diaphragm seal, it now becomes possible to either mechanically cause the entrapped air to leave through the bleed port by moving the diaphragm 30 up and down slowly as oil is filled through the central port 62, or to draw off the air by a vacuum pump in a manner well known in the art. As indicated in the previous discussion, it had often been necessary to provide an intricate design to the upper housing itself, including special radially extending channels so that air could be drawn out through the center. This is no longer required in the invention disclosed herein.

Figure 5:
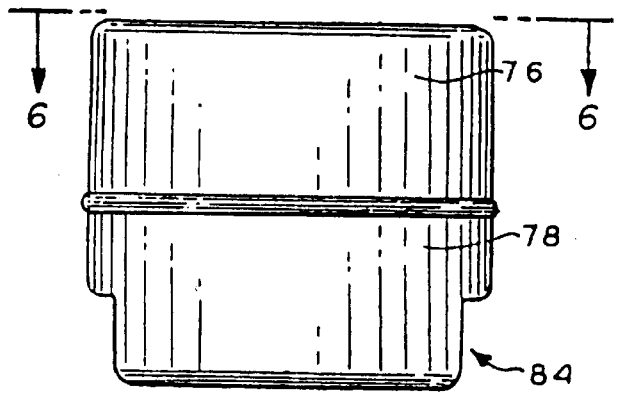
FIG. 5 is a side view of another diaphragm seal constructed in accordance with the teachings of this invention.
Figure 6:
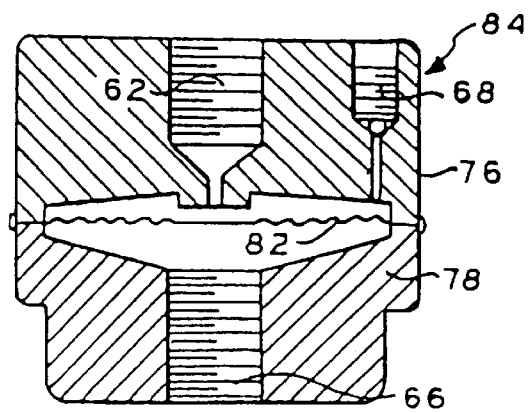
FIG. 6 is a sectional view of the seal of FIG. 5 taken along lines 6—6.
Figure 7:
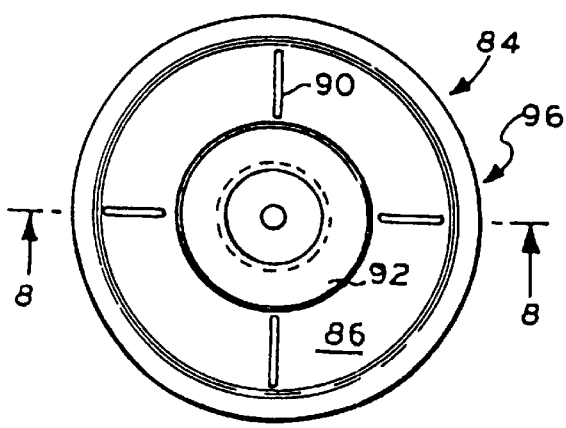
FIG. 7 is a top view of another diaphragm seal constructed in accordance with the teachings of this invention.
Figure 8:
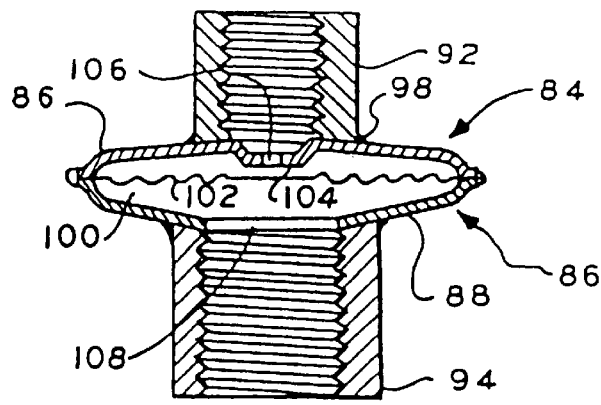
FIG. 8 is a sectional view of the seal of FIG. 7 taken along lines 8—8.

Another valuable feature of the invention disclosed herein is the ability to weld the diaphragm 30 within the housing at the very periphery. In the past, most diaphragm seals were secured by clamps or bolts, as previously discussed. However, this invention lends itself to have the upper and lower housings 76 and 78, respectively, grip the outer uncorrugated surface 80 of a diaphragm 83 (FIG. 5). The unit 84 (FIGS. 5 and 6) may be assembled by welding the diaphragm 82 to the housing sections 76 and 78 by such well known means as electron beam or laser welding. The resulting assembly is simpler in design and much more economical than the current bolted up design. Therefore, the resulting device is of a much more simplified design. Of course, the lower housing 78 of this invention cannot be removed for cleaning out the process media. This design is best suited where upper and lower housings may be made of similar materials. The resulting savings in material by the elimination of flanges is an economy in its manufacture and results in a smaller sized unit. Further, the welding eliminates all possibility of leakage for both the fill and media side of the housing. Still another embodiment 84 (FIGS. 7 and 8) of this invention provides for the welding of upper and lower housings 86 and 88 in a manner well known in the art. The housing walls, which are, as indicated, made from stampings, may have ribs 90 (FIG. 7) therein for purposes of strengthening and reinforcing the housing. Members such as, for example, casting or machine parts 92 and 94 on both the instrument and the media sides of the diaphragm seal 96 may be inserted within suitably disposed apertures in the upper and lower housings 86 and 88, respectively, and then joined, as by welding 98 in place. It is preferred that the members 92 and 94 and stampings 86 and 88 be of the same material. Secured within the housing cavity 100 is a diaphragm 102. The upper casting 92 is so formed as to provide a valve seat 104 with a valve port 106. The casting 92 is threaded to accept a threaded fitting (not shown). The lower housing casting 96 has a second chamber port 108 for admitting media. Because of the means of fabricating the housings 86 and 88, a bleed port (not shown) may be added, as by welding thereto by still another casting. This device operates in the same manner as other embodiments therein and offers the advantage of inexpensively fabricated components. Furthermore, this device is believed to be inexpensive as to justify its use as a disposable unit.

Very often, it is desirable to apply more than one instrument to a diaphragm seal. In the past, this was accomplished by means of a "T" connection extending from the seal. The principles of this invention make for a much more convenient and, it is believed, economical construction. Thus, a seal 110 (FIG. 9) may comprise joined upper and lower housings 112 and 114. A cavity 116 within the housings 112 and 114 may have a diaphragm 118, of similar construction as the previous diaphragms 30, 82, and 102 discussed herein, secured between the housings 112 and 114. A valve 120, comprising the diaphragm valve member 122 and a valve seat 124, operates as before. Here, however, the seat 124 has two valve ports 121 and 123. The valve ports 121 and 123 may separate from each other in a "Y" configuration so that they may be enlarged to receive fittings 126 and 128 therein. The operation of this embodiment (FIG. 9) remains on the same principle as the other embodiments herein. The two valve ports 121 and 123 give access to two instruments (not shown), thereby replacing the "T" connection. On the other hand, this construction gives rise to still another use—as a flow control in which a diaphragm 118 controls the flow of liquids through the valve ports 121 and 123. The valve 120 closes when pressure in the second chamber 130, as previously described, is greater than the spring rate of the diaphragm and opposing pressure in the first chamber 132.

In this manner, there is provided a differential control valve 110 for the flow of a liquid 134 through the housing 112. In addition, if there is a loss of pressure on either side of the valve ports 121 or 123, the valve 120 will close, sealing and preventing excessive loss of liquid in the lines connected thereto. Thus, this device acts as a safety or control valve for the lines.

The concept of using the device of this invention as a flow-through control lends itself to yet another embodiment. A housing 140 is comprised of an upper and lower housing 142 and 144, respectively, and defining therewithin the cavity 146. Clamped between the upper and lower housing 142 and 144 may be a diaphragm 148, having the same substantial configuration of the prior devices herein and secured to the housings 142 and 144, as by welding. The diaphragm 148 therein divides the cavity 146 into first and second chambers 150 and 152, respectively. The lower housing 144 may have disposed therein an entry port 154 with a fitting 156 secured therein. The fitting 156 may be employed to secure a pipe 158 or other conduit to the housing 140. As in the previously discussed embodiment (FIG. 9), there is a valve 160, which comprises a valve seat 162, which forms an integral part of the upper housing wall 164 of the first chamber 150 of the cavity 146 and a valve member 166, formed as an integral part of the diaphragm 148. The seat 162 may have, as previously described, two ports 167 and 168, respectively. As with the previous embodiment having two valve seat ports (FIG. 9), the ports 167 and 168 within the upper housing 142 may have a generally "Y" shaped configuration so that the conduit path may be enlarged to receive therein fittings 170 and 172, respectively. The second chamber 152 may, in addition to its entry or upstream port 152, have an exit or downstream port 174. The location of the second chamber downstream port 174 may be at any convenient location. Preferably, the port 174 is located to one side of the second chamber upstream port 154. The second chamber upstream port 154 is centrally disposed to give, it is believed, a more efficient distribution of the forces of pressure provided by a liquid 176 circulated through the device 178.

The second chamber downstream port 174 may be "L" shaped, extending out of the cavity 146 and at the side of the housing 140. At its exit from the housing 140, the port 174 may be enlarged to receive a fitting 180. This fitting 180 may secure a conduit 182 to the second chamber downstream port 174. This conduit 182 is, in turn, connected to the upstream valve port 167 by the fitting 170 associated therewith. The fitting 172 in the downstream valve port 168 secures a conduit 184 to the downstream valve port 168. Thus, it will be seen that there is provided a communication between the second chamber 152 and the first chamber 150 by means of the conduit 182.

In operation (FIG. 10), a flow of liquid (which may be any suitable hydraulic liquid) is established through the upstream second chamber port 154 in the direction of the arrow 186. The flow will continue through the second chamber 152, out the downstream port 174, through conduit 182, through upstream valve port 167, through the first chamber 150, and out the downstream valve port 168 and conduit 184. As long as the flow of the liquid is in the direction of the arrow 186, and as long as the spring rate (i.e., the pressure necessary to deflect the diaphragm to a closed positioning) of the diaphragm 148 and the pressure between the valve seat 162 and the diaphragm valve member 166 remains at least as great as the pressure of the liquid against the valve member 166 in the second chamber 152, the valve: 160 will remain open and the flow will continue. Let us assume for the moment, however, that, for some reason, the pressure drops significantly at the downstream valve port 168 because, for example, of a line rupture or intentional opening of the line. In that instance, it is preferred that the liquid 176 runs out of the downstream port 168 at a greater rate than it enters the first chamber 150 through the upstream port 167. The pressure in the first chamber 150 will drop until the spring rate of the diaphragm 130 is overcome by the pressure on the second chamber 152 and the valve 160 will close, sealing off the upstream conduit 186 from the downstream conduit 184. It will be noted that the downstream valve port 168 has a comparatively larger volume than the upstream valve port 167. This relationship is considered preferable to encourage the rapid removal of liquid 176 and closing of the valve 160, once the system has begun to lose liquid on the downstream side 184. Obviously, a rapid flow out will not be easily made up by the slower flow into the first chamber 150. Upon the pressure in the second chamber 152 dropping below the predetermined valve closing pressure, the valve 160 will reopen. Thus, the operation of the unit will repeat. Thus, in a brake system where pressure in the second chamber 152 may drop, permitting valve 160 to open, a return of pressure will cause the valve 160 to close and prevent a further loss of liquid. If a gas were to be used in the valve devices of FIGS. 9 or 10, instead of a liquid, the entrapping function would not be as important. Instead, the valve 160 can be designed so that the diaphragm 148 deforms under pressure, closing the valve 160, sealing off the system.

The valve device of FIG. 10 is believed particularly useful in multi-lines in such control systems as in which the liquid, usually an oil, is intended to drive brakes of an automobile, controls of aircraft, or the like. Should a break occur in the downstream line, a great deal of the brake liquid can be saved and the operating integrity of the remainder of the system preserved by virtue of the valve closing.

Figure 11:
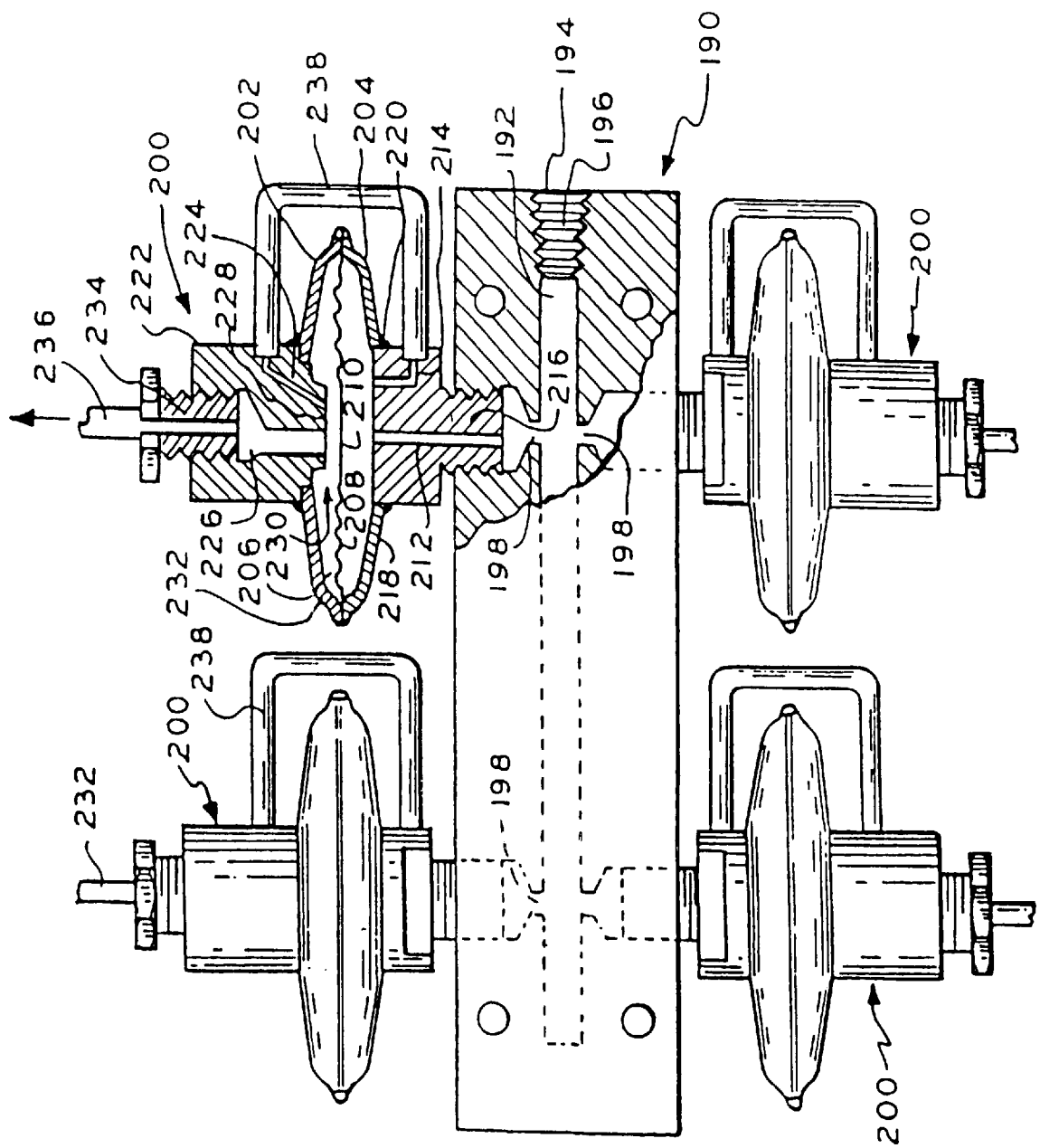
FIG. 11 is partially sectioned side view of another flow control device constructed in accordance with the teachings of this invention.

One example of the uses of the flow control, in which the break in the downstream side of a line allows the valve to close and thereby protect an overall system, may be provided with a plurality of such valve devices integrally joined to a manifold device 190 (FIG. 11). The manifold 190 may take any convenient shape, as, for example, a substantially metallic rectangular body member having a centrally disposed conduit 192 formed therein as by drilling or casting. The conduit 192 may exist at one end 194 of the manifold 190. This exit of the manifold conduit 192 may be provided wit a threaded portion 196 to receive a fitting (not shown). This end 194 represents the upstream portion of the manifold. The downstream end of the manifold conduit 192 terminates in a plurality of manifold branches 198. Each branch 198 forms a downstream port of the manifold 190 and is so dimensioned as to receive, at its exit, a fitting. The fitting in each instance herein comprises a valve control unit 200. Each unit 200 operates on the flow control principles of the previously described embodiment 178. Thus, if one of these unit 200 is described, the same description will suffice for all other units 200. As with prior devices herein, each unit may comprise upper and lower housings 202 and 204, respectively, which have therein a cavity 206. A diaphragm 208, having a centrally disposed valve member 210 (as previously described), is secured between the upper and lower housings 202 and 204. For simplicity and economy of manufacture, the housings 202 and 204 may be formed by a combination of stampings and castings, as indicated in connection with the device of Fib. 7. Thus, the second chamber upstream and downstream ports 212 and 214 may be formed as an integral part of a casting 216 included to fit within an aperture in the remainder of the lower stamping 218. The juncture of the second casting 216 and the lower stamping 218 may be sealed as by, for example, welding 220 or similar joining means at the periphery. The upstream second chamber port 212 exits through a portion of the second casting 216, having a general fitting configuration to be secured to the manifold 190.

A first casting 222 has therein the upstream and downstream valve ports 224 and 226. The upstream port 224 may, for example, enter the first casting 222 at a side while the downstream valve port 226 exits through an end of the generally cylindrical first casting 222. The lower portion of the first casting 222 may be shaped to form the valve seat 228 of the valve 230. This first casting 222 is disposed within a stamping 232, formed the remainder of the upper housing 202. As indicated in the fabrication of a previous embodiment of stamping and castings (FIGS. 7 and 8), the diaphragm 208 and stamping 218 and 232 are jointed, as by welds 220.

The valve downstream port 226 may be so enlarged as to receive a fitting 234. The fitting 234 retains a downstream conduit 236. The downstream second chamber port 214 may be interconnected to the upstream valve port 224 by means of a conduit 238 which may be inserted within each casting 216 and 222 and joined, as by welding.

In operation, should any line 236 suddenly lose pressure or liquid, the valve 200 would close, protecting the remainder of the system from loss of fluid.

Still another embodiment of this invention is related to the necessity of controlling the sealing or seating of a diaphragm to close or valve a line. It will be observed that central to the previous embodiments is the fact that liquid is entrapped between the diaphragm and the housing wall when the diaphragm valve member seats, thereby cushioning and protecting the diaphragm. This cannot be overlooked as an essential ingredient to the invention herein, in that the liquid entrapped protects the diaphragm against damage. This damaging of the diaphragm has been an essential difficulty of main devices and particularly of diaphragm seals. Still another approach, however, is to control the seating of the diaphragm so that it deforms intentionally and purposely, thereby permanently sealing the system. Thus, while rupture is avoided, permanent distortion of the diaphragm is not. The result is a disposable control device 240 (FIG. 12). Thus, for example, there may be provided a housing 250 comprising an upper and lower housing 252 and 254. As disclosed, a main portion of these housings 252 and 254 may be in the form of stampings or any other convenient form (as, for example, the bolted up part arrangement). An upstream second chamber port 256 may extend through a second casting 258 welded to the lower housing stamping 254. This casting 258 may have, as an integral part thereof or welded thereto, a downstream conduit 260 for communicating with the first chamber 262 and casting 264. A downstream valve port 266 may extend through the casting 264 from the first chamber 262 of the housing cavity 268. As in previous devices herein, the cavity 268 is divided by a diaphragm 270. The diaphragm 270, which has a plurality of concentric corrugations 272, is joined and held at its circumference by the upper and lower housings 252 and 254. The first casting 264 may be somewhat recessed within the upper housing wall 274, thereby forming, for example, a substantially cylindrical depression 276 within the upper housing wall inside the chamber. The diaphragm 270 may have a matching cylindrical boss 278, which is in registry with the cylindrical depression 276. It is believed that the diaphragm 276 may be so disposed, such that when the pressure in the second chamber 280 becomes great enough to force the diaphragm 270 against the first chamber depression 276 the cylindrical boss 278 may insert itself within the cylindrical depression 276, permanently sealing shut the unit. In the embodiment, the unit has a one-time use, valving or closing the system against further use in the future. The corrugations 2727 of the diaphragm 270 are so disposed, such that, while they abut the upper housing wall 274 when the valve closes, it is immediately sealed shut without rupturing. This may be accomplished by appropriately dimensioning the diaphragm 270 so that the portions against the wall 274 may, indeed, distort the diaphragm 270, but will not cause the diaphragm to buckle or split open. There is no need, however, to shape the upper housing wall 274 to conform to the corrugations or shape of the diaphragm. Of course, it is not considered essential that liquid be trapped between the diaphragm and the housing.

Still another device is suggested by the dual valve ports 121 and 123 (FIG. 9) when used as a diaphragm seal. There have been provided, in the past, means for adjusting the upper limit of a pressure instrument. A simplified method may be provided by assembly of a fittings 125(a) (FIG. 13) for insertion in, for example, the upstream valve port 121 of the dual valve port unit 110. The fitting 125(a) may be, for example, generally hollow, having secured across the opening 280 a bellows 282 of, for example, metal which also opens into the port 121.

The liquid in a cavity 132 would enter the bellows 282. An aperture 284, in the upper, closed end 286 of the fittings 126(a), has extending therethrough an adjusting means, as, for example, a threaded screw 288, releasably held in place by a locknut 290. In operation, pressure is applied to the process side 130 of the diaphragm 118 (FIG. 9), until a maximum gauge reading is obtained. The screw 288 (which has been tightened down upon the bellows 282) is released, until the diaphragm 118 is so positioned as to close valve 120 at the desired pressure, thereby protecting the instrument (now shown) from damage or rupture. Any attempted addition of liquid to the compartment or chamber 132 is prevented by the closing of the valve 120. Thus, the valve provides over-range protection for the meter 64.

Figure 14:
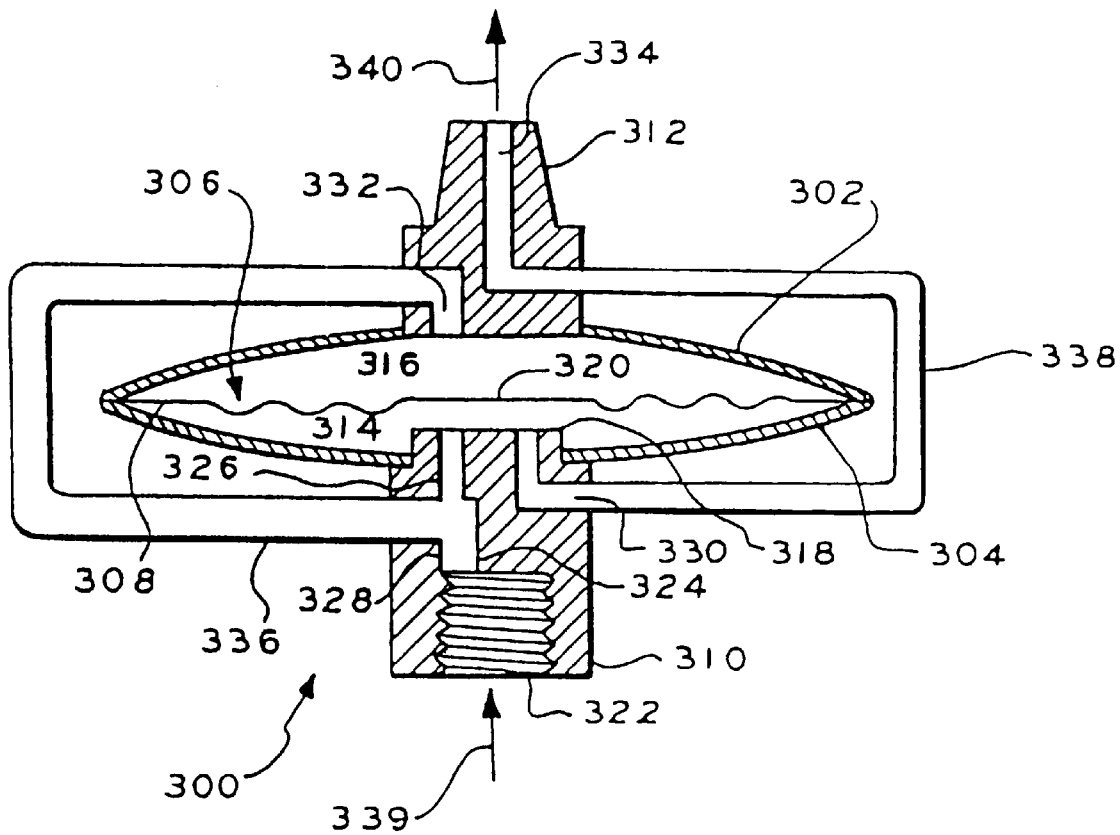
FIG. 14 is a schematic of another device constructed in accordance with the teachings of this invention.
Figure 15:
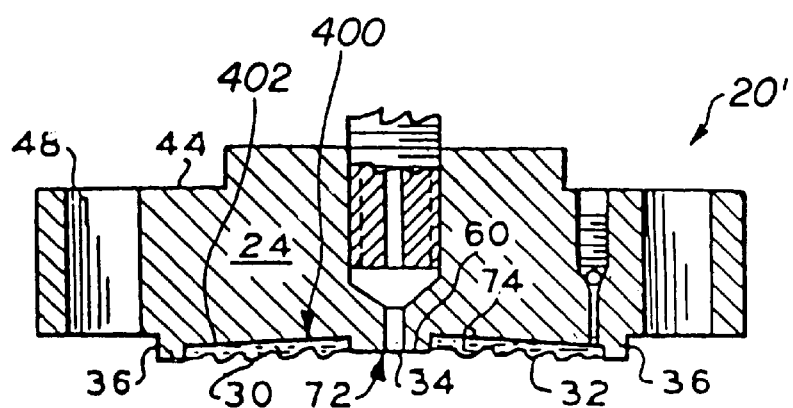
FIG. 15 is a schematic sectional view of yet another device constructed in accordance with the teachings of the invention.

In still another embodiment, there is provided a valve device 300 (shown in schematic form in FIG. 14). This valve device 300 may be constructed in accordance with the teachings of any of the prior art devices herein. Preferably, the type of construction shown in connection with the devices 84 of Fib. 8 or 240 of Fib. 12 may be used, wherein castings and stampings are employed. The stampings 302 and 304 may take the form of a generally disc shape, defining a cavity 306 therebetween. A diaphragm 308, having the same or similar construction as other diaphragms discusses herein before, may be disposed between the upper and lower housings 302 and 304, respectively, and the combination joined or secured together, as by welding or the like. The upper and low housing 302 and 304, respectively, may have centrally disposed apertures therein. Secured in the apertures, and completing the cavity 306 on opposed sides of the diaphragm 308, are members 310 and 312, respectively, which may be made from castings or machine parts and joined, as by welding or the like in place. Thus, the diaphragm 308 devices the cavity 306 into two chambers 314 and 316, respectively. The first member 310 may be so formed as to define within the first chamber 314 the valve seat 318, which serves the same function as the valve seats in the previously discussed devices herein. Accordingly, the diaphragm 308 is provided with a centrally disposed valve member 320.

The first member 310 may have a threaded opening 322, so as to receive a fitting (not shown). Communicating with the threaded opening 322 and into the first chamber 314 is a conduit or portal path 324, the lower portion of which is necked down to a narrower diameter, as at 326. The larger diameter portion 328, which interconnects the threaded portion or opening 322 with the narrow diameter portion 326, also exits from the side of the first member 310. The function of this portion of the larger diameter path 328 will be more fully explained below. The narrower portal path 326 provides an opening through the valve seat 318 into the first chamber 314. In a similar manner, a second portal 330 is provided in the valve seat 318 and extends out through the first member 310. The function of the second portal 330 will be more fully explained hereinafter.

On the opposed side of the diaphragm 308 and completing the second chamber 316 may be the second member 312, which has therethrough a port 332. This second chamber portal 332 preferably has the same diameter as the larger diameter portion 328 of the first port 324 of the first chamber 314 and extends from the second chamber 316 and through the second member 312. As will appear below, while not entirely essential, a conduit path 334 may be provided through the second member 312, exiting therefrom. A conduit 336 may be provided interconnecting the larger diameter port 328 with the second chamber port 332. This conduit 336 may be secured to the first and second members 310 and 312, as by welding or the like. Its cross-sectional area is preferably equal to that of the first chamber larger area portal 328 and the second chamber port 332.

In a like manner, a second conduit 338 may interconnect the second first chamber portal 330 and the conduit path 334 passing through the second member 312. Obviously, the conduit 334 may merely exit from the first member 310, if desired, without passing through the second member 312.

In operation, the threaded opening 322 may be inserted into a source of upstream pressure (represented by the arrow 339). The pressure may be of any type of fluidic pressure. Thus, in the example discussed herein, in a hydraulic system, such as found in brakes on automobiles or trucks, a master piston (not shown) may provide pressure in a direction shown by the arrow 339. Fluid (e.g., a liquid), passing through the device 300, would pass out of the conduit channel 334 in the second member 312, in the direction of the second arrow 340. It will be immediately apparent that a sudden surge of fluidic pressure entering at the threaded opening 322, if greater than the spring rate of the diaphragm 308 and larger than the back pressure provided by the brakes (for example), would be fed through the larger diameter portion 324, 336, and 334 into the second chamber 316. As a result, the diaphragm valve member 320 may be caused to close against the valve seat 318, thereby cutting off the flow. When the back pressure upon the downstream conduit paths 330, 338, and 334 is sufficiently large, it would overcome this surge of pressure, reopening the valve to a flow of fluid. There is, thus, provided a feedback system for sensing surges in pressure against which the system may be wished to be protected. It is also apparent that, if there is a leakage in the downstream section (i.e. the line attached to the conduit path 334), the greater pressure on the upstream portion would be substantially fed into the second chamber 316, closing the valve device 300.

One application of a device of this construction would be to those, for example, of an automobile or truck braking system. There have been proposed complicated and expensive systems intended to prevent a skidding wheel from becoming locked. Usually, such systems are provided with electronic systems of high degrees of complexity. A plurality of the device 300 of this invention, secured to, for example, the manifold 190 (FIG. 11), would provide a similar result as these systems, with an economic advantage. For example, if one assumes that each of the lines 232 (of FIG. 11) are connected to the conduit path 334 for each of the devices 300 (which are, in turn, secured to the manifold 190), any leaking in any one of the lines 232 (leading to a brake) would cause the device 300 to close, as indicate above. Just as importantly, however, there would also be provided a means for adjusting the pressure on any single wheel of the vehicle. Thus, if one supposes that one wheel of the vehicle begins to spin freely, the back pressure on that line 232, provided by the wheel, would be reduced substantially. As a result, the upstream pressure, by comparison, may surge or increase, closing the valve 300. At the same time, the remaining lines 232, which were in balance, remain open. Thus, pressure from the master piston would not be delivered to the spinning wheel until such time as the wheel engaged the surface of the road and could apply the back pressure necessary to reopen the valve 300As might be expected, the affected valve device 300, on its particular line, stutters, or opens and closes, as the pressure builds up and drops, while pressure to the other wheels is constant. This is precisely the action desirable in an effort to prevent trucks or cars from swerving.

It will be appreciated that the principles of the inventions disclosed herein may be applicable to other shaped devices having desired configurations. The valve may be located at other positions in a cavity having any other desired configuration. Thus, for example, it is possible to have a device housing in which the valve member is in registry with two valve seats—one in the first chamber and one in the second chamber, thereby making a system responsive to pressures exerted in either chamber.

Still another configuration is to use only one part of the device. In other words, the upper housing 24 (see FIGS. 3 and $) may be used without the lower housing 26. So constructed, the principles of operation would remain precisely the same. In this configuration, the portion of the device (FIG. 3) now operated as a whole could be inserted into a vat to measure the hydrostatic pressure or bolted into a container or conduit to measure the pressure therein. This conduit or container (now shown) would thereby form the so-called second chamber, discussed with reference to the previous embodiments herein. In this connection, it should also be appreciated that the liquid 74 may be replaced by any other fluid, such as a gas. f a gas were used in place of a liquid, it is obvious that the diaphragm would not entrap and thereby form a hydrostatic cushion. However, the valve mechanism would still be expected to be operable.

Figure 4:
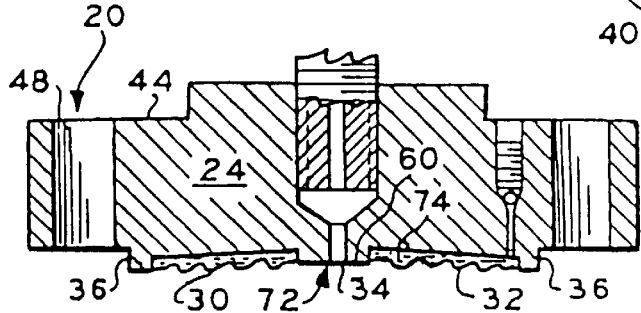

In yet another embodiment, a control device of the type previously disclosed herein (such as, for example, that disclosed in FIGS. 4 or 9) may include an over-range sensing device. he upper housing 24 (as shown in FIGS. 3 and 4) may be used, with or without a lower housing 26. The significant aspect of this embodiment is that there is added a pressure transducer 400. This transducer 400 is well known in the art. One such transducer would be a piezoresistive integrated circuit which provides an output voltage proportional to the applied pressure. This transducer may be, for example, secured to the housing 20 prime in the wall 402 of the housing 24 in the first chamber or compartment 54. When the valve 72 closes, no further pressure can be transmitted to the meter 64.

Accordingly, any additional pressure on the diaphragm would not be measured. However, by placing the transducer 400 in the wall of the housing in the volume of the entrapped liquid, additional pressure against the diaphragm is transmitted to the wall and hence the transducer 400 thereby provides an indication of the increased pressure.

The transducer used herein is well known in the art. One such transducer may be, for example, a SenSyn LX04XXA. It may be connected to a suitable detection and visual readout device which is well known in the art (not shown).

In another embodiment, one of the fluid openings or ports in the first compartment or chamber (see, for example, 121 in FIG. 9) may serve as a bleed port having a check valve construction of the type shown in FIG. 3 (at 70). This bleed port enables the removal of liquid from the first compartment or chamber until the valve closes.

In still another embodiment, there may be provided a diaphragm seal 500 (FIG. 16) which may be essentially similar in construction and operation to the diaphragm seal 20 (FIG. 2). Identical parts are indicated with the same reference numbers. Modified parts with similar functions are accented. The housing 22' may have an upper and lower housing 24' and 26' which, when joined, define a cavity 28. A diaphragm 30' is disposed within the cavity in a manner similar to the seal 20. The diaphragm 30' may have a plurality of concentric corrugations 32 and a center, uncorrugated portion 34. The upper house 24' may be provided with an annual recess 502. The diaphragm 30' may have an upturned annular collar or lip 504 which is intended to mate with the annual recess 502 in the upper housing 24' (FIG. 17).

The lower housing 26' may have a first annular opening with cylindrical a wall 506 canted inwardly from the top 508 or where it mates with the upper housing 24' inwardly, toward the axis in a frustum conical shape ending in a shoulder 510. A cylindrical port 512, which defines the shoulder 516, provides access from the exterior 514 of the housing 26' to the cavity 518 within the housing 22'.

Within the cavity 518 and extending through the port 512 may be an insert which may be made of plastic and, preferably, Teflon 520. The insert 520 outer surface may be in the shape of an enlarged frustum conical end 522 with a depending cylindrical stem 524. The outer surface 526 of the enlarged end 522 is so dimensioned as to conform to and mate with the canted wall 510 of the housing 26'. The cylindrical stem 524 has a threaded port 528 for receiving a threaded pipe 530 or the like.

They cylindrical stem 524 may have an annular ring or boss 532 which mates with an annular groove in the port 512 in the housing 26'.

The insert 520 may have an inner wall 534 which is also frustum conical in shape for defining the interior cavity 518 within the housing 26'. The threaded port 526 intersects and provides access into the cavity 518.

Optionally, the shoulder 510 may have a knurled surface 530. The knurled surface 530 will engage the mating surface of the insert 520 to lock the insert in place. Alternatively, the juncture of the surface 530 and the wall 522 may be serrated so as to engage and lock the insert 520 into place.

The seal 500 operates in the identical manner to the seal 20. The Teflon insert provides the advantage of being inert to most corrosive materials. As is well known, Teflon has low tensile strength and high lubricity. These characteristics limit the pressure rating of Teflon and its use in high pressure lines. However, by placing a Teflon insert 520 in a high tensile strength housing 26', permits the use of Teflon in high pressure lines, vessels, and the like which carry corrosive chemicals. Such a use has particular application with diaphragm seals in the process housing. Another application is in pipe lines (which is discussed below) such as in couplings in plastic or glass lined pipes.

The mating canted walls 506 and 526 of the housing 26' and the insert 520 aid in forming a seal between the insert 520 and the housing 26'. As the forces of the fluid carried by the insert increases, the Teflon's characteristic to flow under pressure causes a tighter and tighter seal to the interior walls. The housing 26' has the effect of increasing the pressure rating of the Teflon insert, thereby making it available for use in high pressure vessels, pipes and the like. In addition, the diaphragm mates in the upper housing 24' by having its rim 504 engage the annual groove 502. Another aspect of this invention is the integrally formed annual ring 524 which engages and seals with the mating annular groove. As the Teflon insert flows under the pressure, there will be same sealing effect as provided by an O ring.

An application of this principal to a union 550 (FIG. 18). By way of example, the union 550 may have matting housings 552 and 554 each having the same general configuration as the lower housing 26' which uses the Teflon insert 512. Thus, each insert 520 mates with its respective housing 552 or 554. The union housings 552 and 554 may be joined by any well known means, such as union nuts (not shown). A shoulder 530 in the housing may have the same structure as that discussed in connection with the seal 500 (see FIG. 19). The support provided by the housings 552 or 554 effectively increases the pressure rating of the Teflon inserts 520. The union 550 may be sealed by an O ring 556. As in the seal 500, the threaded openings or ports 560 can engage pipes 562. Here, again, the flow characteristics of the Teflon make for a very tight seal between the insert and the pipes. The mating Teflon inserts form a continuous seal, forced in ever tighter relationship due to the pressure of the materials and the flow characteristics of the Teflon and support of the housing.

What is claimed is:

1. A control device for controlling the flow of liquids in a hydraulic system, said device comprising:
   a) a housing defining a fluid retaining cavity, said housing having a first fluid opening into said cavity;
   b) a flexible diaphragm extending across said cavity, said housing having a first fluid opening into said cavity;
   c) a valve seat formed in said housing adjacent and surrounding said first fluid opening;
   d) a valve member formed with said diaphragm as a part thereof for cooperative engagement with said valve seat to thereby form a valve; and
   e) a fluid retaining volume defined by a surface of said housing wall excluding said valve seat and a surface area of said diaphragm, excluding said valve member; said diaphragm surface area being substantially entirely opposed to said housing wall surface area whereby upon movement of said diaphragm to bring said valve member into a closed seating position on said valve seat, fluid retained within said retaining volume completely fills said retaining volume so that a force against said diaphragm is directly transmitted by said fluid to said housing to thereby cushion said diaphragm against damage throughout said surface area.

2. A control device as recited in claim 1 wherein said diaphragm in combination with said housing defines said first and a second fluid containing compartment; said first fluid opening is within said first compartment; said housing having a second compartment first fluid opening spaced from said first fluid opening.

3. A control device as recited in claim 2, wherein said diaphragm means comprises a generally symmetrically shaped diaphragm, said valve member comprises a central portion of said diaphragm.

4. A control device as recited in claim 3, wherein said diaphragm has a plurality of concentric convolutions about said valve member, said valve member being coated with a sealing means.

5. A control device as recited in claim 4, herein said sealing means comprises Teflon.

6. A control device as recited in claim 3, wherein said housing having a second fluid opening into said first compartment and through said valve seat so that upon the closing of said valve, said first and second fluid openings of said first compartment are closed from each other and said first compartment.

7. A control device as recited in claim 6, wherein said valve seat comprises a boss extending into said first compartment and in registry with said valve member and having substantially planar extending end surface for abutting said valve member.

8. A control device as recited in claim 7, wherein said housing comprises an upper and lower housing of rigid material, each having therein one of said compartments and joining therebetween said diaphragm, said valve member lying substantially in the same plane of the diaphragm including surface area said valve upon closing said diaphragm being flexed.

9. A control device as recited in claim 8, wherein said valve closes in response to pressure of fluid in said second compartment; means connected to said housing and to said first compartment second fluid opening for adjusting the pressure at which said valve closes, said adjusting means comprises a fluid receiving chamber connected to said second fluid opening and means for increasing or decreasing the volume of said chamber so as to remove or increase the fluid in said first compartment, said valve upon closing separates, said first and second fluid openings so that any increase or decrease in said chamber volume is prevented from effecting the measure or direction of flow of fluid in said first fluid opening of said first compartment.

10. A control device as recited in claim 9, said adjusting means further comprises a bellow housing secured to said second fluid opening a bellows secured within said housing and defining a bellows chamber, said bellows being intended to receive liquid in said bellows chamber from said first chamber, and means for engaging and adjusting the position of said bellows within said housing, such that said liquid in said first chamber may be added to or subtracted from said first compartment collapsing or enlarging said bellows by operation of said adjustment.

11. A control device as recited in claim 8, further comprises a downstream second fluid opening into said second compartment and a conduit connecting said second compartment second fluid opening with the second of said two openings into said first compartment so that said valve thereby controls the flow of fluid between said compartments and through said device.

12. A control device as recited in claim 11, wherein said second fluid opening of said first compartment has a smaller cross-sectional area than said first fluid opening of said first compartment opening so that liquid conveyed into and out of said first compartment acts to operate said valve to thereby control the flow of liquid through said first compartment fluid openings such that a predetermined relative drop in pressure in said first compartment with respect to said second compartment causes said valve to close.

13. A control device as recited in claim 3, wherein said upper and lower housing comprise, in combination, a cylinder with flange portions extending radially therefrom and having holes for receiving bolts and nuts for securing said flange portions.

14. A control device as recited in claim 3, wherein said housing has a generally cylindrical shape, and wherein said diaphragm is secured to said upper and lower housings and sealed therein by a peripheral weld around the circumference thereof.

15. A control device as recited in claim 3, wherein said housing is comprised of substantially hemispherical stampings having centrally disposed apertures and further comprising members having therein said first and second chamber ports said members being welded to said stampings, thereby completing said upper and lower housings.

16. A control device as recited in claim 6, wherein said upper and lower housing comprise, in combination, a cylinder with flange portions extending radially therefrom and having holes for receiving bolts and nuts for securing said flange portions.

17. A control device as recited in claim 6, wherein said housing has a generally cylindrical shape, and wherein said diaphragm is secured to said upper and lower housings and sealed therein by a peripheral weld around the circumference thereof.

18. A control device as recited in claim 6, wherein said housing is comprised of substantially hemispherical stampings having centrally disposed apertures and further comprising members having therein said first and second chamber ports, said members being welded to said stampings, thereby completing said upper and lower housings.

19. A control device as recited in claim 1, wherein said housing having a second fluid opening into said first compartment and through said valve seat.

20. A control device as recited in claim 19, wherein said valve member lies substantially in the same plane of the diaphragm including said diaphragm surface area, said valve upon closing said diaphragm being flexed.

21. A control device as recited in claim 20, wherein said valve closes in response to a force against said diaphragm means connected to said housing and to said first compartment second fluid opening for adjusting the pressure at which said valve closes, said adjusting means comprises a fluid receiving chamber connected to said second fluid opening and means for increasing or decreasing the volume of said chamber so as to remove or increase the fluid in said first compartment, said valve upon closing separates said first and second fluid openings so that any increase or decrease in said chamber volume is prevented from effecting the pressure or direction of flow fluid in said first fluid opening of said first compartment.

22. A control device as recited in claim 21, said adjusting means further comprises a bellow housing secured to said second fluid opening, a bellows secured within said housing and defining a bellows chamber, said bellows being intended to receive liquid in said bellows chambers from said first chamber, and means for engaging and adjusting the position of said bellows within said housing, such that said liquid in said first chamber may be added to or subtracted from said first compartment by collapsing or enlarging said bellows by operation of said adjustment.

23. A control device of the type employing a fluid therein, comprising:
   a) housing means having a cavity therein;
   b) a planar diaphragm secured to said housing and enclosing together with said housing a first compartment of said cavity, said first compartment being so constructed as to receive therein the fluid, said diaphragm being so disposed as to move in response to pressure; said housing having a valve seat extending into said first compartment and a first fluid opening in said seat; and
   c) said valve planar diaphragm having a part thereof for engaging to thereby form a valve.

24. A control device as recited in claim 23, further comprises a second compartment, said diaphragm separating said first and second compartments, said second compartment having a fluid opening.

25. A control device as recited in claim 24, further comprises said valve seat having a second fluid opening, said valve, upon closing, substantially simultaneously closing said first and second fluid opening.

26. A control device as recited in claim 25, wherein a conduit connects said second compartment fluid opening to a first of said two fluid openings in said first compartment, such that, upon a surge of fluid entering said first compartment through said first fluid opening in excess of a predetermined pressure, said valve closes.

27. A control device as recited in claim 26, wherein said first fluid opening of said first compartment is downstream port in a path of fluid flow, said conduit has a larger cross sectional dimension than the cross-sectional area of said first fluid opening substantially at the entrance of said first fluid opening into said first compartment such that pressure changes in said first compartment are sensed and transmitted to said second compartment through said conduit; upon said pressure changes in said first compartment exceeding a predetermined value, said pressure in said second chamber directed against said diaphragm causes said diaphragm to close against said valve seat, the fluid stream being capable of flowing through said first fluid opening to said conduit and through said first fluid opening into said first compartment and out through said second fluid opening of said first compartment.

28. A control system for a fluidic control line of the type in which there is provided a central source of fluidic pressure to be conveyed through a plurality of lines, said control system comprising:
   a) a manifold connecting the central source of pressure to the line; and
   b) each of said valves comprises a housing having a cavity therein; a diaphragm secured to said housing and dividing said cavity into first and second compartments, said second compartment having a port therein or communication with one of said manifold conduits, said second compartment having a downstream opening, said first compartment comprises a valve seat extending from said housing, said valve seat having upstream and downstream fluid opening extending through said housing; a conduit interconnects said downstream second compartment opening with said upstream valve fluid opening; said diaphragm comprising an integrating valve member, said valve member, in combination with said valve seat, comprising said valve such that, upon pressure in said second compartment exceeding the pressure in said first compartment by a predetermined amount, said valve closes to thereby prevent liquid in said manifold from exiting through said downstream fluid opening.

29. A control system as recited in claim 28, wherein said downstream valve fluid opening ha a larger diameter than said upstream valve fluid opening.

30. A control device for controlling the flow of liquids in a hydraulic system of the type intended to be used as an interface between a fluid conduit and a liquid filled meter, comprising:
   a) a housing having therein a liquid retain cavity and having a first and second liquid opening; said liquid opening being capable of connection to the meter;
   b) a diaphragm connected to said housing and defining therewith a first compartment;
   c) a valve seat formed in said housing and surrounding said first and second fluid openings;
   d) a valve member in combination with said diaphragm for cooperative engagement with said valve seat to thereby form a valve, said valve upon closing closes said first and second liquid openings from each other and from said first compartment; and e) means connected to said second liquid opening for adjusting the amount of liquid in said first compartment such that upon the valve being open the amount of liquid removed by said adjusting means alters the reading of the meter and upon said valve closing said valve preventing further adjustment by said adjusting means from effecting the meter reading.

31. A device as recited in claim 30, wherein said adjustment means comprises a bleed port connected to said first fluid opening for removing liquid from said first compartment.

32. A device as recited in claim 30, wherein said adjusting means comprises means for adding liquid to said first compartment and an adjustment housing secured to said housing and to said second liquid opening; a bellows within said adjusting housing opening into said second liquid opening, a screw means secured to said adjusting housing and engaging said bellows so as to permit said bellows to extend or to collapse said bellows thereby removing or adding liquid to said first compartment with said valve being open.

33. A device as recited in claim 30 wherein said adjusting means comprises means for adding liquid to said first compartment and an adjusting housing secured to said housing and to said second liquid opening; said adjusting housing having adjusting cavity connected to said second liquid opening; and a plunger slidable within said adjusting cavity so that by positioning said plunger within said adjustment cavity increases or decreases the volume of said adjusting cavity to thereby remove or add liquid to said first compartment with said valve being opened.

34. A control device of a type having a liquid therein comprising:

a) a housing having a cavity therein;
b) a diaphragm secured within said housing and defining within said housing cavity at least one compartment;
c) a valve seat formed within said housing and extending into said first compartment and having at least a first fluid opening therethrough;
d) a valve member for engaging said valve seat and movable in response to movement of said diaphragm; said valve seat in combination with said valve member comprising a valve; upon a force being exerted in a predetermined direction against said diaphragm said valve closes in response to said diaphragm; upon said valve closing the liquid is entrapped within said first compartment; and
e) an electrical mechanical transducer within said first compartment secured to said housing such that before and after the closing of said valve forces upon said diaphragm in said predetermined direction are sensed by said transducer.

35. A control device as recited in claim 1 further comprises an electromagnetic transducer within said housing cavity and said retaining volume such that before and after said valve closes said force against said diaphragm causes said transducer to provide an electrical signal indicative thereof.

36. A control device as recited in claim 11 further comprises an electromagnetic transducer within said housing cavity and said retaining volume such that before and after said valve closes said force against said diaphragm causes said transducer to provide an electrical signal indicative thereof.

37. A control device as recited in claim 2 further comprises an electromagnetic transducer within said housing cavity and said retaining volume such that before and after said valve closes said force against said diaphragm causes said transducer to provide an electrical signal indicative thereof.

38. A device capable of use in seals, vessels, pipes, or the like for use with materials of corrosive chemical composition, said device comprising:

a) housing means for withstanding high pressure lines; and
b) liner means of a Teflon-like material within said housing for being sealed tightly within said housing to thereby protect said housing means from the effects of the corrosive chemical compositions.

39. The device of claim 38 wherein said housing means comprises defining therewithin a cavity; said cavity having canted walls; said liner means having walls conforming to and matting with said cavity walls to thereby form a seal under the pressure of the compositions.

40. The device of claim 39 where in said housing cavity having at least one part thereof in a generally frustum conical shape; said liner means comprising an insert within said cavity and having a matching frustum-conical outer dimensions for mating with the shape of the cavity.

41. The device of claim 40 further comprises said housing means having a support wall; said insert comprises at least one wall for engaging and being supported by said support wall of said housing means.

42. The device of claim 41 wherein said housing means comprises a housing having a generally frustum conical shape and said one wall of said insert having a mating frustum conical shape.

43. The device of claim 42 wherein at least one wall of said housing means having a knurl-like surface for engaging the mating surface of said insert.

44. The device of claim 43 wherein at least one wall of said housing means having serrations for engaging a mating surface of said insert.

45. The device of claim 40 wherein said housing means is a union; at least one frustum-conical cavity within and defined by at least a part of said housing; said liner means comprising a Teflon-like insert and having a threaded port there through for providing access to said cavity and means for joining with a pipe or the like.

46. The device of claim 41 wherein said union housing comprises two housing parts which have therein symmetrically shaped cavities which, upon being joined define the interior cavity housing; said Teflon insert comprises matching inserts, one for each frustum-conical cavity; means for joining the two housing.

47. The device of claim 46 wherein at least one wall of said housing means having a knurl-like surface for engaging the mating surface of said insert.

48. The device of claim 47 wherein at least one wall of said housing means having serrations for engaging a mating surface of said insert.

49. The device of claim 40 wherein said housing means is a diaphragm seal; said housing means comprising an instrument housing and a process housing; said liner means being disposed within said process side.

50. The device of claim 49 wherein said housing having at least one frustum-conical cavity within and defined by at least a part of said housing; said liner means comprising a Teflon-like insert and having a threaded port there through for providing access to said cavity and means for joining with a pipe.

51. The device of claim 50 wherein at least one wall of said housing having a knurl-like surface for engaging the mating surface of said insert.

52. The device of claim 51 wherein at least one wall of said housing having serrations for engaging a mating surface of said insert.

* * * * *

UNITED STATES PATENT AND TRADEMARK OFFICE
CERTIFICATE OF CORRECTION

PATENT NO. : 6,116,281
DATED : SEPTEMBER 12, 2000
INVENTOR(S) : MICHAEL MASTROMATTEO

It is certified that error appears in the above-indentified patent and that said Letters Patent is hereby corrected as shown below:

On the title page, item:

[76] INVENTOR: MICHAEL MASTROMATTEO, 61 SUFFERN LANE
GARNERVILLE, N.Y. 10923

Signed and Sealed this

Seventeenth Day of April, 2001

Attest:

NICHOLAS P. GODICI

*Attesting Officer*   *Acting Director of the United States Patent and Trademark Office*